United States Patent
Sawada

(10) Patent No.: US 7,522,307 B2
(45) Date of Patent: Apr. 21, 2009

(54) COLOR IMAGE PROCESSOR

(75) Inventor: Takayuki Sawada, Numazu (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 1002 days.

(21) Appl. No.: 10/947,659

(22) Filed: Sep. 23, 2004

(65) Prior Publication Data

US 2006/0061784 A1    Mar. 23, 2006

(51) Int. Cl.
*G06F 15/00* (2006.01)
(52) U.S. Cl. .................. 358/1.9; 358/518; 358/519; 358/501
(58) Field of Classification Search .............. 358/1.9, 358/518, 519, 501
See application file for complete search history.

(56) References Cited

FOREIGN PATENT DOCUMENTS

JP           6-178090 A      6/1994
WO     WO 2004/071072 A1    8/2004

*Primary Examiner*—Edward L. Coles
*Assistant Examiner*—Michael Burleson
(74) *Attorney, Agent, or Firm*—Foley & Lardner LLP

(57) ABSTRACT

The present invention relates to a method and an apparatus having, a first color conversion unit which executes first color conversion with respect to an image, a first image output unit which reproduces/outputs the image based on an output of the first color conversion unit, a second color conversion unit which executes second color conversion with respect to the same image, and a color conversion output synthesis unit which synthesizes a third color conversion output using outputs of the first and second color conversion units, wherein the apparatus selects one of outputs of the first color conversion unit and the color conversion output synthesis unit to thereby restore the color of the original image before the compression from the compressed image.

17 Claims, 3 Drawing Sheets

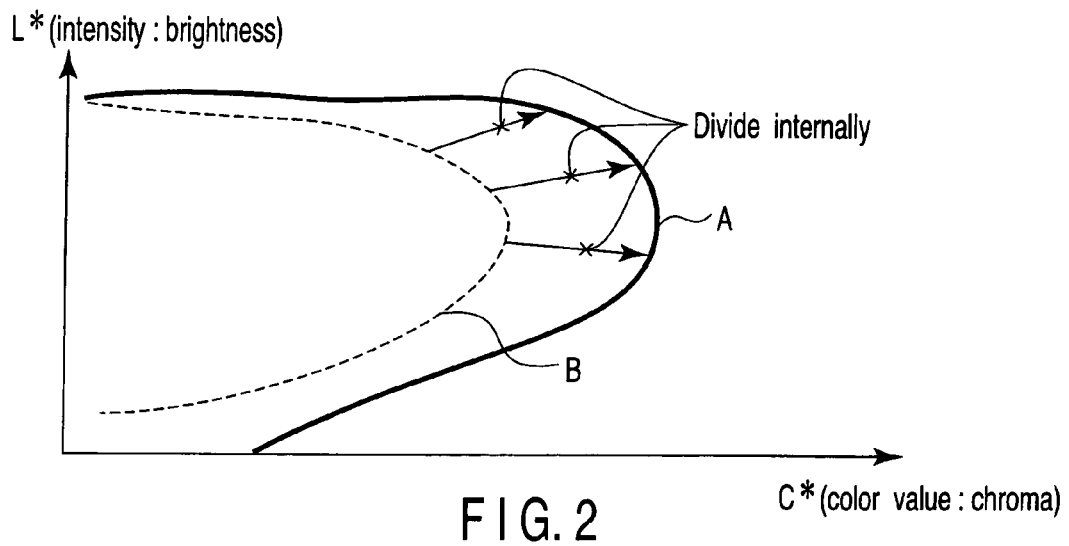
FIG. 2
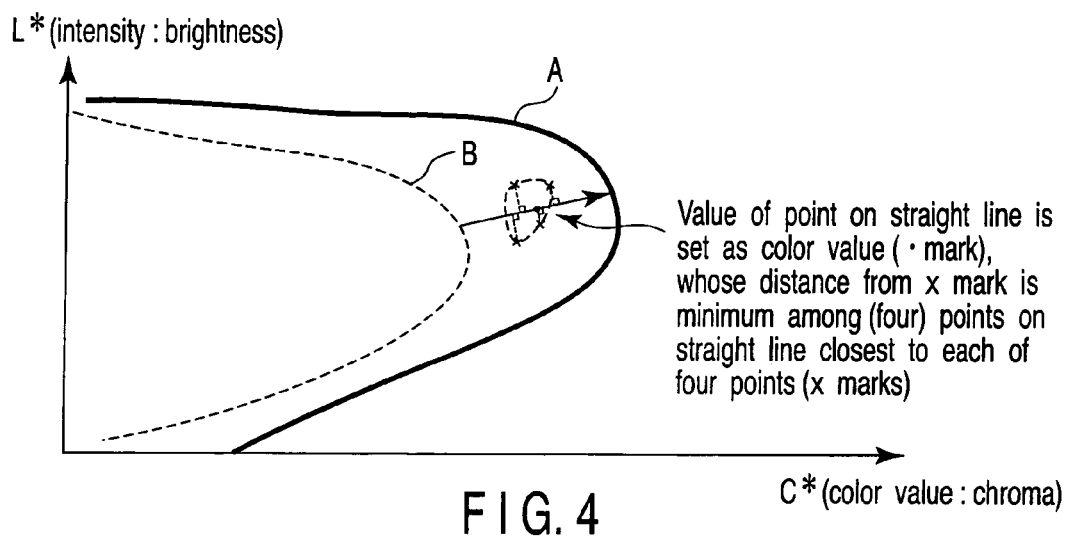
FIG. 4
| Color value (Indication) | TAG "1"→outside | Color value (Indication) | TAG "1"→outside | Color value (Indication) | TAG "1"→outside |
|---|---|---|---|---|---|
| A,A,A | 0 | B,A,A | 0 | C,A,A | 0 |
| A,A,B | 0 | B,A,B | 0 | C,A,B | 1 |
| A,A,C | 0 | B,A,C | 1 | C,A,C | 0 |
| A,B,A | 1 | B,B,A | 1 | C,B,A | 1 |
| ⋮ | ⋮ | B,B,B | 0 | ⋮ | ⋮ |
FIG. 5

COLOR IMAGE PROCESSOR

BACKGROUND OF THE INVENTION

1. Field of the Invention

The present invention relates particularly to a fixing apparatus which is usable in image forming apparatuses such as a copying apparatus and a printer apparatus in an electrophotographic system using a thermally melting developer and which fixes a developer to an output object.

2. Description of the Related Art

When a given image includes a color outside a gamut reproducible by a color image output apparatus, that is, a non-reproducible color, it is a general method to map colors outside the gamut in colors inside the gamut and output the colors. This is referred to as gamut mapping. As a method of the gamut mapping, some algorithms are known in accordance with a purpose of color reproduction. Since the gamut in a broad range is mapped in the gamut in a narrower range in many cases, the gamut mapping is sometimes referred to as gamut compression.

In a color image forming apparatus (MFP), an application is considered in which images rendered for printing output are stored inside, and reused for efficiency. The rendered image is gamut-compressed in accordance with the gamut of the printing output.

However, when the gamut-compressed image is reused, and color conversion is simply traced in reverse, the color of an original image cannot be restored. This is because as color values of C, M, Y (Bk is sometimes independent) which are color components of subtractive mixture of a certain printer, a plurality of color values exist in an original gamut-compressed space. That is, the color values of C, M, Y (, Bk) are not necessarily the color values of the original color space obtained by inverse conversion in which one correct answer is obtained.

BRIEF SUMMARY OF THE INVENTION

An object of the present invention is to solve the above-described problem and to provide means for restoring an original color from a gamut-compressed image.

According to the present invention, there is provided a color image processing apparatus comprising:

first color conversion means for executing first color conversion with respect to an image;

second color conversion means for executing second color conversion with respect to the same image;

color conversion output synthesis means for synthesizing an output of third color conversion from outputs of first and second color conversions; and image output means for selectively outputting one of the outputs of the first and third color conversions.

Moreover, there is provided a color image processing apparatus which restores a color of an original image before gamut compression from a gamut-compressed image in a gamut of an output device, comprising:

first color conversion means for converting a device color signal of the output device into a first source color space coordinate value reproduced by the device by the device color signal;

second color conversion means for converting the device color signal into a second source color space coordinate value mapped in the device color signal;

gamut compression degree image supply means for supplying a gamut compression degree image indicating a gamut compression degree with respect to each pixel of an original image;

thumbnail image supply means for supplying a thumbnail image of the original image;

color conversion output synthesis means for producing a third color conversion output based on an arbitrary pixel value of the thumbnail image using outputs of the first and second color conversion means; and color conversion result selection means for selectively outputting one of the output of the first color conversion means and the output of the color conversion synthesis means based on the pixel value of the gamut compression degree image.

Furthermore, according to the present invention, there is provided a color image processing apparatus which restores a color of an original image before gamut compression from a gamut-compressed image in a gamut of an output device, comprising:

a first color conversion unit which converts a device color signal of the output device into a first source color space coordinate value reproduced by the device by the device color signal;

a second color conversion unit which converts the device color signal of the output device into a second source color space coordinate value mapped in the device color signal;

a gamut compression degree image supply unit which supplies a gamut compression degree image indicating a gamut compression degree with respect to each pixel of an original image;

a color conversion output synthesis unit which produces a third color conversion output based on a pixel value of the gamut compression degree image using outputs of the first and second color conversion units; and a color conversion result selection unit which selectively outputs one of the output of the first color conversion unit and the output of the color conversion synthesis unit based on an instruction from the outside.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic diagram showing one example of a color conversion algorithm concept for use in the color image processing apparatus shown in FIG. 1;

FIG. 4 is a schematic diagram showing one example of the concept of the color conversion algorithm for use in the color image processing apparatus shown in FIG. 3; and FIG. 5 is a schematic diagram showing one example of a "gamut tag table" for use in the color image processing apparatus shown in FIG. 3.

DETAILED DESCRIPTION OF THE INVENTION

An embodiment of the present invention will be described with reference to the drawings.

Figure 1:
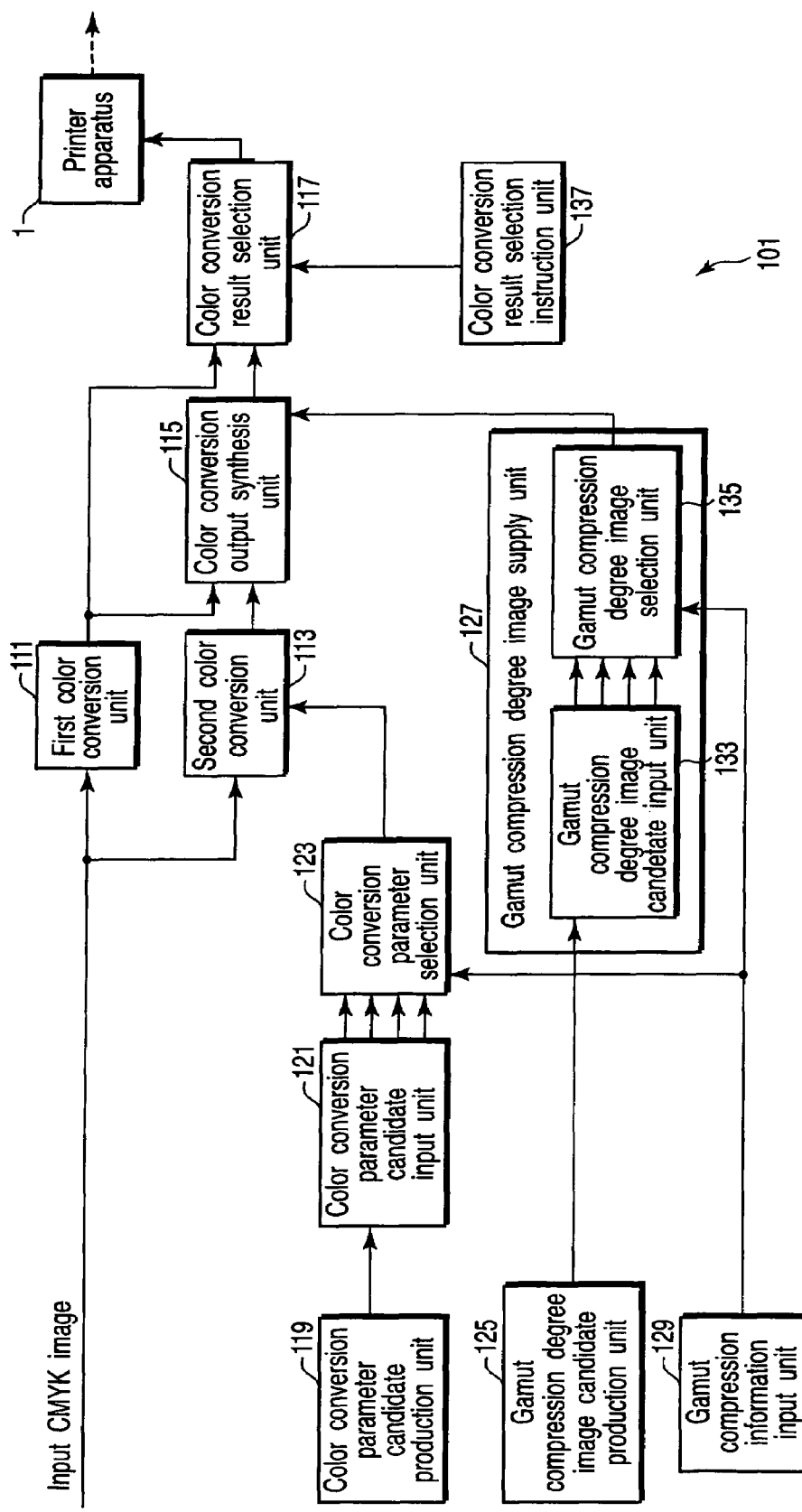
FIG. 1 is a schematic diagram showing one example of a color image processing apparatus to which an embodiment of the present invention is applied.

FIG. 1 is a schematic diagram showing one example of a color image processing apparatus which restores a color of an original image represented by another color space (e.g., L*, a*, b*, or R, G, B image) from an image color-converted into a C, M, Y, Bk image for printing output, that is, which performs inverse color conversion. It is to be noted that the inverse color conversion is color conversion inverse to color conversion from R, G, B into C, M, Y, Bk which is forward color conversion, that is, color conversion from a source color space with respect to arbitrary C, M, Y, Bk values into a printer color space.

A color image processing apparatus 101 includes a first color conversion unit 111, a second color conversion unit 113, a color conversion output synthesis unit 115, a color conversion result selection unit 117, a color conversion parameter candidate production unit 119, a color conversion parameter candidate input unit 121, a color conversion parameter selection unit 123, a gamut compression degree image candidate production unit 125, a gamut compression degree image supply unit 127, a gamut compression information input unit 129, a color conversion result selection instruction unit 137 and the like.

An input C, M, Y, Bk image is supplied to the first color conversion unit 111 and the second color conversion unit 113.

The first color conversion unit 111 converts the input C, M, Y, Bk image into a source color space (color space of the original image) coordinate value corresponding to the color to be actually printed by C, M, Y, Bk values which are pixel values. That is, the input image is subjected to first color conversion. An output of the first color conversion unit 111 is supplied to the color conversion output synthesis unit 115 and the color conversion result selection unit 117 described later. One of the image output supplied to the color conversion result selection unit 117 and the output of the first color conversion unit 111 is finally supplied to a printer apparatus 1.

The second color conversion unit 113 converts the input C, M, Y, Bk image into a source color space image using a color conversion parameter selectively output from the color conversion parameter selection unit 123. That is, the input image is subjected to second color conversion which is different from the previous first color conversion. The color conversion parameter for use in the second color conversion unit 113 is produced in the color conversion parameter candidate production unit 119.

The color conversion parameter candidate production unit 119 extracts a source color space coordinate value most distant from a source color space coordinate value output from the first color conversion unit 111 from a coordinate value group (generally a plurality of sets of coordinate values exist) of the source color space gamut-mapped in arbitrary C, M, Y, Bk values by forward color conversion with respect to the same C, M, Y, Bk values. Next, a plurality of sets of color conversion parameters output as outputs of the second color conversion unit 113 with respect to the C, M, Y, Bk values are produced from the extracted source color space coordinate values. This produced color conversion parameter is supplied to the color conversion parameter candidate input unit 121. The source color space coordinate value most distant from the first color conversion output coordinate differs with the method of gamut compression at the time of the forward color conversion. Therefore, as the color conversion parameters produced by the color conversion parameter candidate production unit 119, selection candidates are produced as many as usable gamut compression methods.

The color conversion parameter candidate input unit 121 supplies the color conversion parameter candidate group supplied from the color conversion parameter candidate production unit 119 to the color conversion parameter selection unit 123.

The color conversion parameter selection unit 123 selectively outputs the second color conversion parameter from the color conversion parameter candidate group supplied from the color conversion parameter candidate input unit 121 based on information supplied from the gamut compression information input unit 129 described later, and supplies the parameter to the second color conversion unit 113.

The gamut compression information input unit 129 is means for giving information indicating the gamut compression method in producing the C, M, Y, Bk image by the forward color conversion from the outside. The gamut compression information input unit 129 supplies the information (i.e., the information at the time of compression) to the color conversion parameter selection unit 123 and a gamut compression degree image selection section 135 described later in the gamut compression degree image supply unit 127. As the information indicating the gamut compression method, for example, rendering intent (intention) defined in ICC profile format specifications is used. In this rendering intent, integer values from 0 to 3 are used, "0" indicates "perceptual", "1" indicates "relative colorimetric", "2" indicates saturation, and "3" indicates "absolute colorimetric".

The gamut compression degree image candidate production unit 125 produces an image to which a numeric value (gamut compression degree) indicating a degree of change of the color by the gamut compression is assigned from the original image (original image of the forward color conversion), that is, a compression degree image candidate with respect to each pixel of a noted image. The produced gamut compression degree image candidate is supplied to a gamut compression degree image candidate input unit 133 of a subsequent stage in the gamut compression degree image supply unit 127.

The gamut compression degree is defined by a color difference between the color of the source color space coordinate and the color actually output by the C, M, Y, Bk values which are results mapped by the forward color conversion. For example, when the color difference is "0", the pixel value is set to "0". When the value indicates a maximum color difference concerning the noted C, M, Y, Bk values, a maximum value that can be taken as a pixel value is assigned. In another case, the color difference is determined based on a ratio of the color difference to the maximum color difference. That is, when precision (bit number) of the pixel value of the gamut-compressed image is adjusted, a storage capacity for the gamut compression degree image is saved, and the original image color can be restored with a practically sufficient precision.

It is to be noted that as a process before determining the pixel value, the gamut compression degree image candidate production unit 125 searches and determines the maximum color difference from the original source color space coordinate value of the forward color conversion for each C, M, Y, Bk coordinate appearing in the image. The gamut compression degree differs with the method of the gamut compression in the forward color conversion. Therefore, as the gamut compression degree image produced by the gamut compression degree image candidate production unit 125, the selection candidates are produced as many as usable gamut compression methods, and supplied to the gamut compression degree image candidate input unit 133. The gamut compression degree image candidate is produced prior to inverse color conversion.

The gamut compression degree image candidate input unit 133 supplies the gamut compression degree image candidate group supplied from the gamut compression degree image candidate production unit 125 to the gamut compression degree image selection section 135.

The gamut compression degree image selection section 135 selectively outputs the gamut compression degree image from the gamut compression degree image candidate group supplied from the gamut compression degree image candidate input unit 133 based on the information indicating the gamut compression method supplied from the gamut compression information input unit 129, and supplies the image to the color conversion output synthesis unit 115.

The color conversion output synthesis unit 115 synthesizes a first color conversion result supplied from the first color conversion unit 111 and a second color conversion result supplied from the second color conversion unit 113 with respect to each pixel based on the corresponding pixel value of the gamut compression degree image supplied from the gamut compression degree image selection section 135, and supplies the result to the color conversion result selection unit 117. As a color conversion synthesis algorithm in the color conversion output synthesis unit 115, for example, the following equation is used:

$$G3=(GcC_2+(Gmax-Gc)C_1)/Gmax \qquad (1),$$

where C1 denotes a first color conversion output, C2 denotes a second color conversion output, C3 denotes a color conversion synthesis output, Gc denotes a gamut compression degree image pixel value of a noted pixel position, and Gmax denotes a maximum pixel value which can be taken by the gamut compression degree image.

It is to be noted that in a color conversion synthesis algorithm in the color conversion output synthesis unit 115, as shown in FIG. 2, internally dividing points are calculated based on the pixel values of the gamut compression degree image of a track in a source color space connecting an output coordinate output from the first color conversion unit 111 to the output coordinate output from the second color conversion unit 113. That is, in FIG. 2, a curved line A indicates a color space of color conversion original, and a curved line B indicates a color space after the conversion. Since the color space after the conversion is smaller than the color space of the conversion original, it is considered as proper that the color (color value) of the conversion original exists on the straight line extended to the curved line A from an arbitrary point of the curved line B. However, a distance from the curved line B to the curved line A cannot be reproduced until the original color of the conversion original is known. Therefore, when a line segment (track) connecting the curved line B to the curved line A is internally divided based on the pixel value of the gamut compression degree image, a color close to the color of the conversion original can be restored.

The color conversion result selection unit 117 selectively outputs one of the first color conversion result supplied from the first color conversion unit 111 and the color conversion synthesis result supplied from the color conversion output synthesis unit 115 based on a selection instruction given from a color conversion result selection instruction unit 131 described later.

The color conversion result selection instruction unit 131 is an interface which inputs a selection instruction for explicitly selecting one of the first color conversion result supplied from the first color conversion unit 111 and the color conversion synthesis result supplied from the color conversion output synthesis unit 115. Therefore, when instruction information is input by the color conversion result selection instruction unit 131, as described above, an instructed result, for example, selection of the color conversion synthesis result output from the color conversion output synthesis unit 115 (which is different from the color conversion result output from the first color conversion unit 111) is supplied to the color conversion result selection unit 117.

Figure 3:
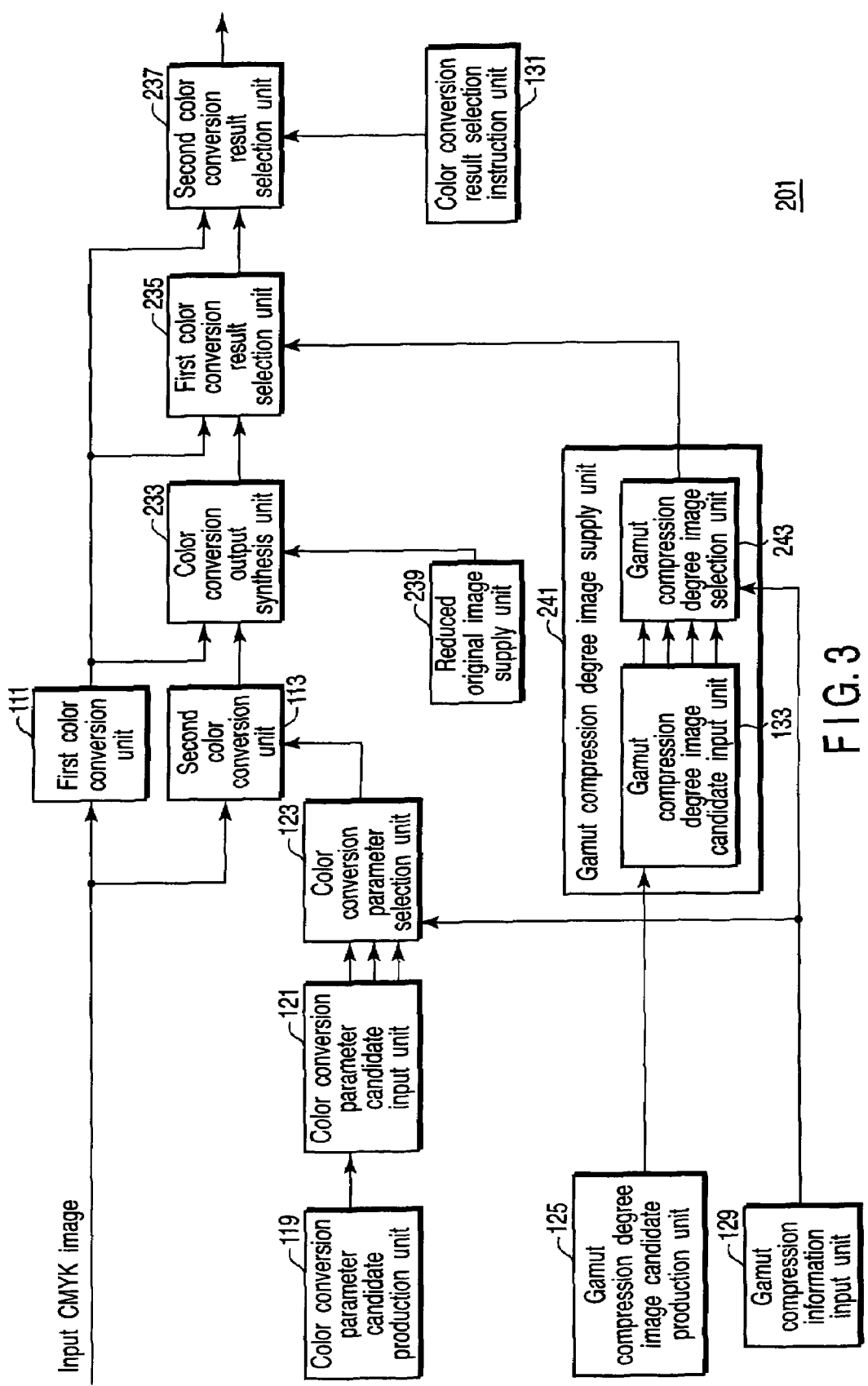
FIG. 3 is a schematic diagram showing one example of an image processing apparatus different from the color image processing apparatus shown in FIG. 1.

FIG. 3 shows one example of another embodiment of the color image processing apparatus shown in FIG. 1. That is, the color image processing apparatus shown in FIG. 3 also restores a color of an original image represented by another color space (e.g., L*, a*, b*, or R, G, B image) from an image color-converted into a C, M, Y, Bk image for printing output, that is. It is to be noted that the same constitution as that of the color image processing apparatus shown in FIG. 1 is denoted with the same reference numerals, and detailed description is omitted.

A color image processing apparatus 201 has a first color conversion unit 111, a second color conversion unit 113, a color conversion output synthesis unit 233, a first color conversion result selection unit 235, a second color conversion result selection unit 237, a reduced original image supply unit 239, a color conversion parameter candidate production unit 119, a color conversion parameter candidate input unit 121, a color conversion parameter selection unit 123, a gamut compression degree image candidate production unit 125, a gamut compression degree image supply unit 241, a gamut compression information input unit 129, a color conversion result selection instruction unit 131 and the like.

An input C, M, Y, Bk image is supplied to the first color conversion unit 111 and the second color conversion unit 113.

The first color conversion unit 111 converts the input C, M, Y, Bk image into a source color space (color space of the original image) coordinate value corresponding to the color to be actually printed by C, M, Y, Bk values which are pixel values. An output of the first color conversion unit 111 is supplied to the color conversion output synthesis unit 233, first color conversion result selection unit 235, and second color conversion result selection unit 237.

The second color conversion unit 113, color conversion parameter candidate production unit 119, color conversion parameter candidate input unit 121, color conversion parameter selection unit 123, gamut compression information input unit 129, gamut compression degree image candidate production unit 125, and gamut compression degree image candidate input unit 133 have been already described with reference to FIG. 1.

A gamut compression degree image selection unit 243 selectively outputs the gamut compression degree image from the gamut compression degree image candidate group supplied from the gamut compression degree image candidate input unit 133 based on information indicating a gamut compression method supplied from the gamut compression information input unit 129, and supplies the image to the first color conversion result selection unit 235.

The reduced original image supply unit 239 supplies a reduced image (thumbnail image) of the original image (represented by the source color space) of the input C, M, Y, Bk image supplied to the first color conversion unit 111 and the second color conversion unit 113 to the color conversion output synthesis unit 233. It is to be noted that the thumbnail image is produced beforehand prior to inverse color conversion, and stored in a thumbnail image holding unit (not shown) (e.g., a predetermined region of an image memory). Therefore, the thumbnail image held, for example, in a predetermined region of an image memory is supplied to the color conversion output synthesis unit 233.

The color conversion output synthesis unit 233 synthesizes a first color conversion result supplied from the first color conversion unit 111 and a second color conversion result supplied from the second color conversion unit 113 with respect to each pixel based on the thumbnail image supplied from the thumbnail image supply unit 239, and supplies the result to the first color conversion result selection unit 235.

A color conversion synthesis algorithm in the color conversion output synthesis unit 233 will be described comparatively with reference to FIG. 4.

In FIG. 4, the curved line A shows a color space of color conversion original, and a curved line B shows a color space after the conversion. First, four pixels in the vicinity in the reduced original image, which surround a noted pixel position of the presently noted C, M, Y, Bk image, are extracted.

On the other hand, a value "●" of a point on a straight line whose distance from "x" is shortest is assumed as a color value among four vicinity pixel values (four points on the straight line (track) closest to each of four "x" in FIG. 4) from the track connecting a first color conversion result C1 to a second color conversion result C2 (it is assumed that all source color space coordinates mapped in one forward color conversion ride on the noted C, M, Y, Bk values on the track, and a straight line is regarded in the present embodiment). That is, a source color space coordinate closest to the pixel value in the vicinity of the noted pixel position in the thumbnail image is extracted on the track in the source (mapping (gamut compression) original into the device color signal) color space, connecting the output coordinate output from the first color conversion unit 111 to that output from the second color conversion unit 113.

The first color conversion result selection unit 235 selectively outputs one of the first color conversion result supplied from the first color conversion unit 111 and the color conversion synthesis result supplied from the color conversion output synthesis unit 233 with respect to each pixel based on the pixel value corresponding to the gamut compression degree image supplied from the gamut compression degree image selection unit 243, and supplies the result to the second color conversion result selection unit 237.

The second color conversion result selection unit 237 selectively outputs one of the first color conversion result supplied from the first color conversion unit 111 and the first color conversion selection result supplied from the first color conversion result selection unit 235 based on the selection instruction given from the color conversion result selection instruction unit 131.

The color conversion result selection instruction unit 131 is an interface which inputs a selection instruction for explicitly selecting one of the first color conversion result supplied from the first color conversion unit 111 and the first color conversion selection result supplied from the first color conversion result selection unit 235. Therefore, when instruction information is input by the color conversion result selection instruction unit 131, an instructed result, for example, the first color conversion selection result output from the first color conversion result selection unit 235 (which is different from the color conversion result output from the first color conversion unit 111) is supplied to the second color conversion result selection unit 237.

As described above in the present invention, it is possible to restore the color of the original image before the gamut compression using the first color conversion result by which the source color space coordinate value of the forward color conversion original in a case where the gamut compression is not performed, and the second color conversion result by which the source color space coordinate value of the forward color conversion original in a case where the gamut compression is performed to the maximum. That is, it is possible to perform interpolation based on the gamut compression degree image indicating a change amount of the color for each pixel by the forward color conversion, estimate the color value of the original image, and restore the color of the original image. When precision (bit number) of the pixel value of the gamut compression degree image is adjusted, storage capacity for the gamut compression degree image is saved, and the original image color can be restored with practically sufficient precision.

Moreover, in the present invention, the color value of the original image is estimated using the thumbnail image which is more easily produced, instead of the gamut compression degree image. Therefore, the gamut compression degree image itself may be used only in the first color conversion result selection unit, the only presence of the gamut compression may be held as information, and therefore the production of the gamut compression degree image candidate, which is a preprocess, can be realized with a simpler constitution.

Furthermore, at the time of the forward color conversion, "gamut clipping" is performed in which the source color space coordinate in the printer gamut is not gamut-compressed, and mapping is performed with respect to the printer gamut surface in the source color space coordinate outside the printer gamut. In this case, the gamut compression degree image is sufficient as long as information indicates whether the image is inside or outside the printer gamut with respect to each pixel. Therefore, in this case, the gamut compression degree image can be easily produced from a gamut tag table of an ICC profile. Concretely, the image can be produced with respect to the original image only by the forward color conversion referring to the gamut tag table shown in FIG. 5. It is to be noted that the gamut tag table shown in FIG. 5 shows whether the arbitrary color space, for example, the coordinate value indicated, for example, by an L*, a*, b* or R, G, B image is inside or outside the gamut ("1" indicates the outside).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A color image processing apparatus comprising:
   first color conversion means for executing first color conversion with respect to an image;
   second color conversion means for executing second color conversion with respect to the same image;
   color conversion output synthesis means for synthesizing an output of third color conversion from outputs of first and second color conversions; and
   image output means for selectively outputting one of the outputs of the first and third color conversions.

2. A color image processing apparatus which restores a color of an original image before gamut compression from a gamut-compressed image in a gamut of an output device, comprising:
   first color conversion means for converting a device color signal of the output device into a first source color space coordinate value corresponding to a color reproduced by the device by the device color signal;
   second color conversion means for converting the device color signal of the output device into a second source color space coordinate value mapped in the device color signal;
   gamut compression degree image supply means for supplying a gamut compression degree image indicating a gamut compression degree with respect to each pixel of an original image;
   color conversion output synthesis means for producing a third color conversion output based on a pixel value of the gamut compression degree image using outputs of the first and second color conversion means; and
   color conversion result selection means for selecting one of the output of the first color conversion means and an output of the color conversion output synthesis means based on an instruction from the outside.

3. The apparatus according to claim 2, wherein the color conversion output synthesis means calculates an internally divided point based on a pixel value of a gamut compression degree image of a track in a source color space, which connects an output coordinate output from the first color conversion means to that output from the second color conversion means.

4. The apparatus according to claim 2, further comprising:
color conversion parameter candidate input means for inputting a plurality of sets of candidates of parameters for use by the second color conversion means;
gamut compression information input means for inputting information indicating a method of gamut compression; and
color conversion parameter selection means for selecting one set from the plurality of sets of the parameters to be adopted by the second color conversion means based on the gamut compression method input from the gamut compression information input means, and supplying the set to the second color conversion means.

5. The apparatus according to claim 2, further comprising:
gamut compression information input means for inputting information indicating a method of gamut compression;
gamut compression degree image candidate input means, included in the gamut compression degree image supply means, for inputting a plurality of candidates of the gamut compression degree image; and
gamut compression degree image selection means, included in the gamut compression degree image supply means, for selecting one set from the plurality of sets of the gamut compression degree image candidates based on the gamut compression method input from the gamut compression information input means, and outputting the set to the color conversion output synthesis means.

6. The apparatus according to claim 4, further comprising:
color conversion parameter candidate production means for applying a source color space coordinate most distant from the first source color space coordinate as the second source color space coordinate in a source color space coordinate group which is a mapping original into the device color signal in accordance with the method of the gamut compression to thereby produce a parameter to be adopted by the second color conversion means, and supplying the parameter to the color conversion parameter candidate input means.

7. The apparatus according to claim 5, further comprising:
gamut compression degree image candidate production means for assigning a minimum pixel value obtainable by the gamut compression degree image to a pixel having a source color space coordinate value whose gamut compression degree is "0" in an original image source color space coordinate mapped in an arbitrary device color signal as the pixel value of the gamut compression degree image, assigning a maximum pixel value obtainable by the gamut compression degree image to the pixel having a source color space coordinate value whose gamut compression degree is maximum, and assigning a gamut image pixel value to a remaining pixel value based on a ratio with respect to a maximum gamut compression degree in a noted device color signal to thereby produce a plurality of sets of gamut compression degree image candidates, and supplying the candidates to the gamut compression degree image candidate input means in the gamut compression degree image supply means.

8. A color image processing apparatus which restores a color of an original image before gamut compression from a gamut-compressed image in a gamut of an output device, comprising:
first color conversion means for converting a device color signal of the output device into a first source color space coordinate value reproduced by the device by the device color signal;
second color conversion means for converting the device color signal into a second source color space coordinate value mapped in the device color signal;
gamut compression degree image supply means for supplying a gamut compression degree image indicating a gamut compression degree with respect to each pixel of an original image;
thumbnail image supply means for supplying a thumbnail image of the original image;
color conversion output synthesis means for producing a third color conversion output based on an arbitrary pixel value of the thumbnail image using outputs of the first and second color conversion means; and
color conversion result selection means for selectively outputting one of the output of the first color conversion means and the output of the color conversion synthesis means based on the pixel value of the gamut compression degree image.

9. The apparatus according to claim 8, wherein the color conversion output synthesis means extracts a source color space coordinate closest to a pixel value in the vicinity of a noted pixel position in the thumbnail image on a track in the source color space, which connects an output coordinate output from the first color conversion means to that output from the second color conversion means.

10. A color image processing apparatus which restores a color of an original image before gamut compression from a gamut-compressed image in a gamut of an output device, comprising:
a first color conversion unit which converts a device color signal of the output device into a first source color space coordinate value reproduced by the device by the device color signal;
a second color conversion unit which converts the device color signal of the output device into a second source color space coordinate value mapped in the device color signal;
a gamut compression degree image supply unit which supplies a gamut compression degree image indicating a gamut compression degree with respect to each pixel of an original image;
a color conversion output synthesis unit which produces a third color conversion output based on a pixel value of the gamut compression degree image using outputs of the first and second color conversion units; and
a color conversion result selection unit which selects one of the output of the first color conversion unit and the output of the color conversion synthesis unit based on an instruction from the outside.

11. The apparatus according to claim 10, wherein the color conversion output synthesis unit calculates an internally divided point based on a pixel value of a gamut compression degree image of a track in a source color space, which connects an output coordinate output from the first color conversion unit to that output from the second color conversion unit.

12. The apparatus according to claim 10, further comprising:
a color conversion parameter candidate input unit which inputs a plurality of sets of candidates of parameters for use by the second color conversion unit;
a gamut compression information input unit which inputs information indicating a method of gamut compression; and a color conversion parameter selection unit which selects one set from the plurality of sets of the parameter candidates to be adopted by the second color conversion unit based on the gamut compression method input from the gamut compression information input unit and which supplies the set to the second color conversion unit.

13. The apparatus according to claim 10, further comprising:

a gamut compression information input unit which inputs information indicating a method of gamut compression;

a gamut compression degree image candidate input unit which is included in the gamut compression degree image supply unit and which inputs a plurality of candidates of the gamut compression degree images; and a gamut compression degree image selection unit which is included in the gamut compression degree image supply unit and which selects one set from the plurality of sets of the gamut compression degree image candidates based on the gamut compression method input from the gamut compression information input unit and which outputs the set to the color conversion output synthesis unit.

14. The apparatus according to claim 12, further comprising:

a color conversion parameter candidate production unit which applies a source color space coordinate most distant from the first source color space coordinate as the second source color space coordinate in a source color space coordinate group that is a mapping original into the device color signal in accordance with the method of the gamut compression to thereby produce a parameter to be adopted by the second color conversion unit and which supplies the parameter to the color conversion parameter candidate input unit.

15. The apparatus according to claim 13, further comprising:

a gamut compression degree image candidate production unit which assigns a minimum pixel value obtainable by the gamut compression degree image to a pixel having a source color space coordinate value whose gamut compression degree is "0" in an original image source color space coordinate mapped in an arbitrary device color signal as the pixel value of the gamut compression degree image and which assigns a maximum pixel value obtainable by the gamut compression degree image to the pixel having a source color space coordinate value whose gamut compression degree is maximum and which assigns a gamut image pixel value to a remaining pixel value based on a ratio with respect to a maximum gamut compression degree in a noted device color signal to thereby produce a plurality of sets of gamut compression degree image candidates and which supplies the candidates to the gamut compression degree image candidate input unit of the gamut compression degree image supply unit.

16. A color image processing apparatus which restores a color of an original image before gamut compression from a gamut-compressed image in a gamut of an output device, comprising:

a first color conversion unit which converts a device color signal of the output device into a first source color space coordinate value reproduced by the device by the device color signal;

a second color conversion unit which converts the device color signal into a second source color space coordinate value mapped in the device color signal;

a gamut compression degree image supply unit which supplies a gamut compression degree image indicating a gamut compression degree with respect to each pixel of an original image;

a thumbnail image supply unit which supplies a thumbnail image of the original image;

a color conversion output synthesis unit which produces a third color conversion output based on an arbitrary pixel value of the thumbnail image using outputs of the first and second color conversion units; and a color conversion result selection unit which selectively outputs one of the output of the first color conversion unit and the output of the color conversion synthesis unit based on the pixel value of the gamut compression degree image.

17. The apparatus according to claim 16, wherein the color conversion output synthesis unit extracts a source color space coordinate closest to a pixel value in the vicinity of a noted pixel position in the thumbnail image on a track in the source color space, which connects an output coordinate output from the first color conversion unit to that output from the second color conversion unit.

* * * * *